July 28, 1936.  O. JACOBSEN  2,049,204

VALVE

Filed March 11, 1936  3 Sheets-Sheet 1

INVENTOR.
OYSTEIN JACOBSEN
BY James C. Bradley
ATTORNEY

July 28, 1936.  O. JACOBSEN  2,049,204
VALVE
Filed March 11, 1936  3 Sheets-Sheet 2

INVENTOR.
OYSTEIN JACOBSEN
BY James C. Bradley
ATTORNEY

July 28, 1936.  O. JACOBSEN  2,049,204
VALVE
Filed March 11, 1936     3 Sheets-Sheet 3
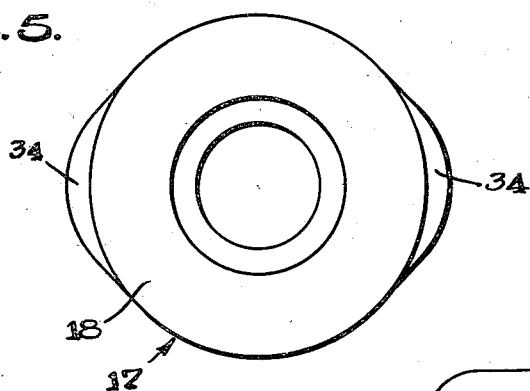
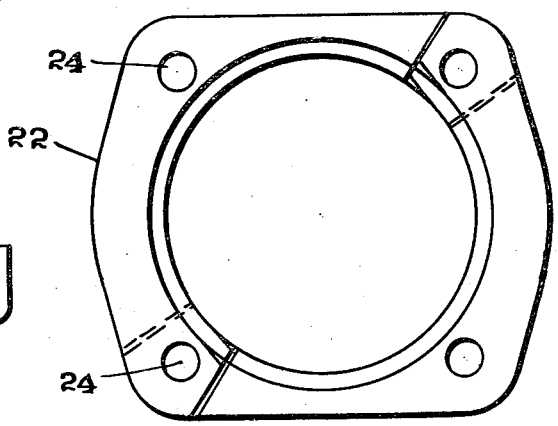
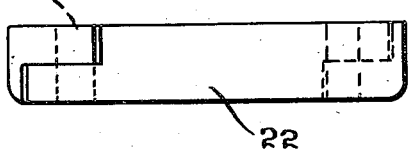
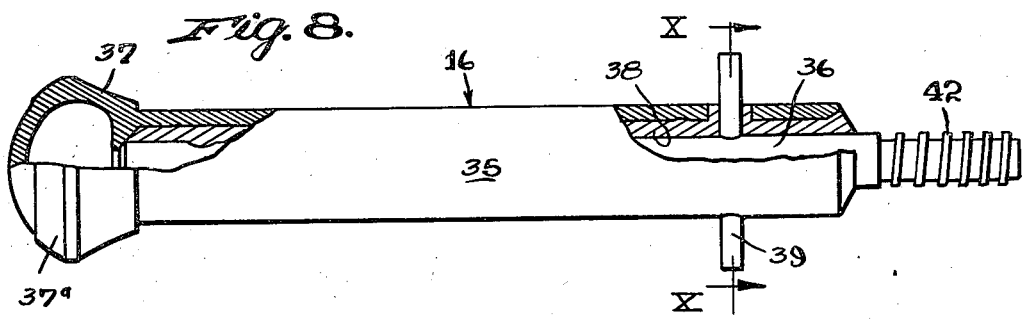
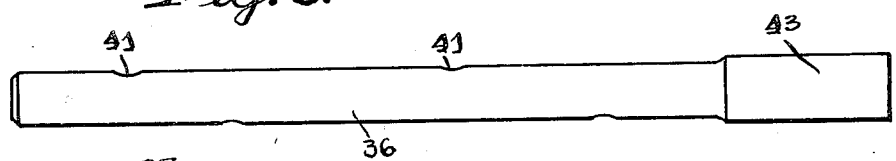
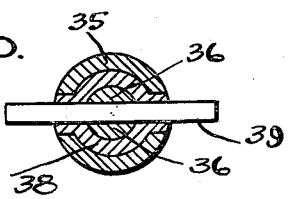
INVENTOR.
OYSTEIN JACOBSEN
BY James C. Bradley
ATTORNEY Patented July 28, 1936

2,049,204

UNITED STATES PATENT OFFICE 2,049,204

VALVE

Oystein Jacobsen, Dayton, Ohio, assignor to The Duriron Company, Inc., a corporation of New York Application March 11, 1936, Serial No. 68,199

5 Claims. (Cl. 251—49)

Figure 1:
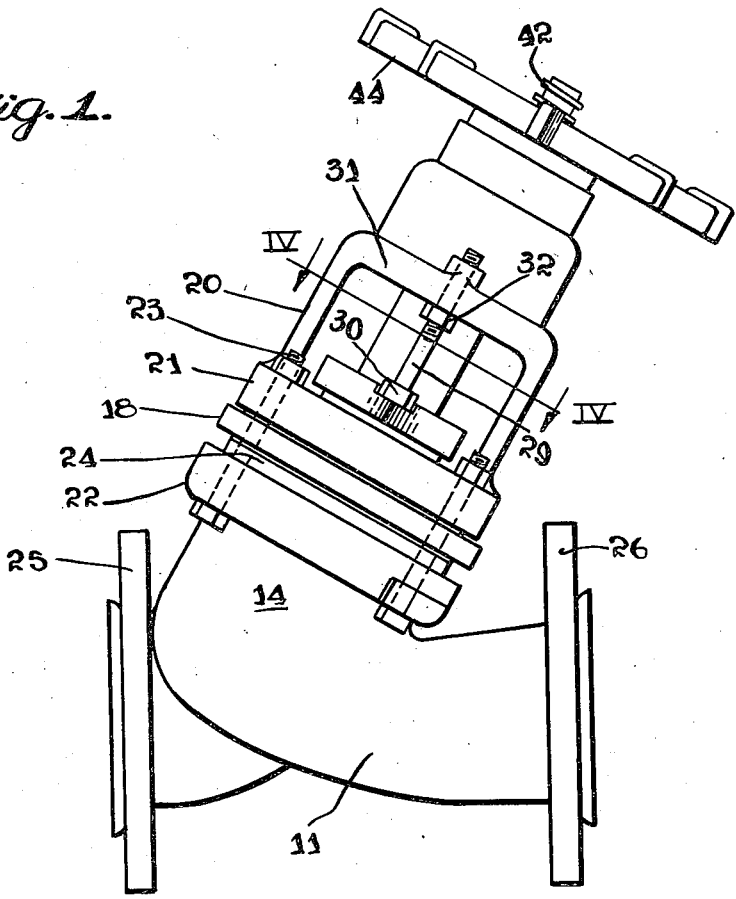
Figure 4:
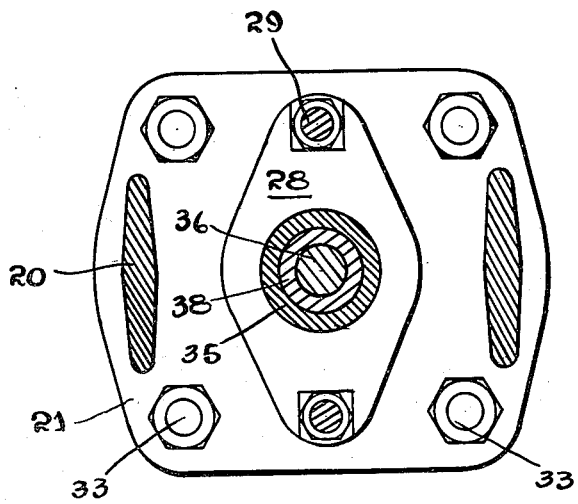
Figure 2:
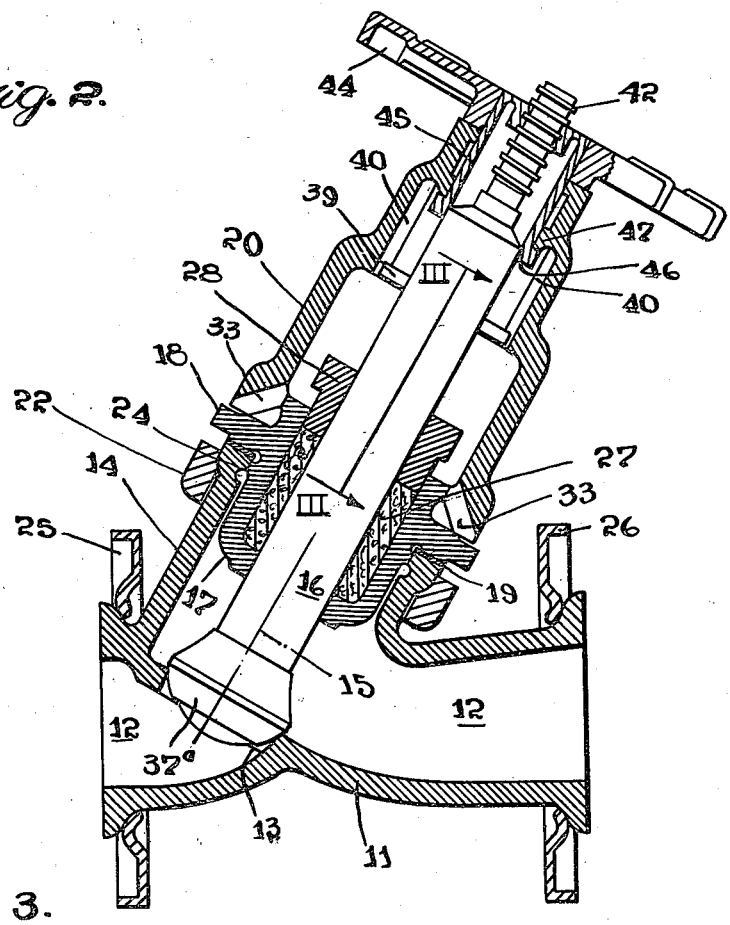
Figure 3:
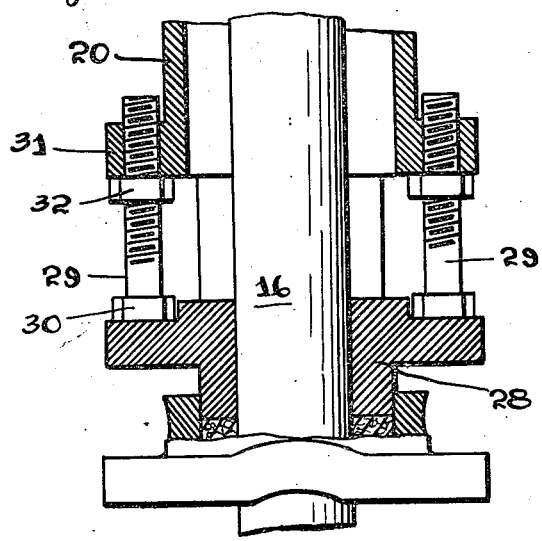

The invention relates to valves and particularly to valves for use in connection with corrosive liquids, such as acids. It has for its principal objects the provision of a valve involving an improved combination of acid resisting composition and machinable metal fabricated in such manner that the parts which are of machinable metal are protected very completely from the corrosive action of the liquids handled by the valve. More particularly, the invention has for one of its objects the provision of a construction wherein any leakage past the stuffing box of the valve is directed so that it is kept out of contact with any valve parts which are of non-corrosion resisting composition and whereby the machined portion of the valve stem (of non-corrosion resisting material) is shielded, not only from the corrosion liquid itself, but from any fumes which may escape into the bonnet of the valve incident to leakage past the stuffing box. One embodiment of the invention is illustrated in the accompanying drawings, wherein:

Figure 1 is a side elevation of the valve. Fig. 2 is a vertical section. Fig. 3 is a section on the line III—III of Fig. 2. Fig. 4 is a section on the line IV—IV of Fig. 1. Fig. 5 is a plan view of the stuffing box. Figs. 6 and 7 are plan and side elevational views respectively of the clamping ring. Fig. 8 is a part side elevation and part section through the valve stem. Fig. 9 is a side elevation of the blank constituting the core of the valve stem. And Fig. 10 is a section on the line X—X of Fig. 8.

Referring to the drawings, 11 is the valve body of corrosion resisting material, such as high silicon iron not subject to machining. In service, it occupies the position shown in Figs. 1 and 2 with the passage 12 therethrough extending in a horizontal direction, and with the valve seat 13 lying in a plane at an acute angle to the horizontal. The body has a tubular extension 14, whose center line 15 is axial with respect to the valve seat. Mounted in the tubular extension is the valve stem 16 surrounded by the stuffing box 17, such box also being of corrosion resisting material and having a flange 18 resting on the end of the tubular extension with a suitable gasket 19 beneath the flange.

Mounted on the flange 18 is the open sided bonnet 20 (Fig. 2) provided with a base flange 21 secured to the clamping ring 22 by four bolts 23. When the nuts on these bolts are tightened, the flange 18 is clamped by the bonnet against the top of the extension 14. The bonnet is of corrosion resisting material. In order to get the clamping ring in place beneath the enlargement or flange 24 at the upper end of the extension 14, it must be of sectional or split form, such as is shown in Figs. 6 and 7. As here shown, the ring consists of two parts with overlapping ends and is provided with four holes 24 for the bolts 23. The ring 22 is of non-corrosion resisting composition, as are also the rings 25 and 26 which serve as anchoring means for attaching the ends of the valve body to the pipe sections between which it lies.

The stuffing box carries the packing 27 which is compressed by the follower 28 of corrosion resisting material. The follower is pushed down by a pair of bolts 29, whose heads 30 lie in recesses in the flange of the follower, and whose shanks extend through a flange 31 on the bonnet (without threaded engagement therewith), the bolts being forced down by the rotation of the nuts 32. Any leakage of corrosive liquid through the stuffing box flows down upon the flange 18 through the openings 33 (Fig. 2) and through the open sides of the bonnet. This leakage moves by gravity to the lowest point on the flange (Fig. 2) and drips down on the body 12 of the valve. The drip at this point will clear the clamping ring 22 which is of non-corrosion resisting material and would be injured by the drip in the ordinary valve construction having a vertical extension in lieu of the angular extension 14. The flange 18 is, therefore, a drainage lip, and to make it effective, is provided with the extensions 34 (Fig. 5) to carry the drip well out past the clamping ring, the stuffing box being turned so that one of these extensions lies at the lowest side of the flange.

The valve stem 16 comprises a sleeve 35 of corrosion resisting composition and a rod 36 of tough machinable metal, such as steel. The lower end of the sleeve is formed into an enlargement 37 which constitutes a valve, and has an annular ground portion 37a for engaging the valve seat 13. The sleeve and rod are secured in the relation shown by a poured filler 38 of antimonial lead or type metal. A guide pin 39 extending through the sleeve and rod is also secured in position by the poured filler. The guide pin rides in the bonnet between the pairs of ribs 40 (Fig. 2) and prevents the stem from turning.

The rod 36 has flattened portions 41 along the length (Fig. 9) to prevent it from turning in the filler, and has at its outer end a screw thread 42 for reciprocating the valve stem as later described. The rod (as shown in Fig. 9) is secured in the sleeve 35 before the blank portion 43 is threaded thus insuring that when the thread is cut, it will be concentric with the center line of the stem. The portion 43 is slightly larger in diameter than the outside diameter of the end of the rod after threading so as to provide leeway in cutting the thread, in case the rod is not exactly concentric with the sleeve.

Mounted on the end of the bonnet, is a hand wheel 44, and to the hub of the wheel is keyed or otherwise secured the bushing 45 of bronze or other suitable machinable metal which is threaded interiorly to fit the threaded end 42 of the valve stem snugly, and has a flange 46 (Fig. 2) fitting beneath the shoulder 47 on the interior of the bonnet. The bushing thus acts as a swivelled nut for reciprocating the valve stem, when the hand wheel is turned. The lower portion of the bushing, fitting as it does, around the upper end of the sleeve 35, serves as a shield for the threaded end of the valve stem, and protects it from the corrosive action of any fumes which escape past the stuffing box and into the bonnet.

It will be apparent that those parts of the valve structure which are not formed from corrosion resisting material are very completely protected from the action of the corrosion fluid which is handled.

What I claim is:

1. In combination, a valve body of corrosion resisting composition having a passage therethrough in substantially a horizontal plane and provided with a valve seat lying at an acute angle to the horizontal, a tubular extension of the casing whose center line is axial with respect to the plane of the valve seat and at right angles thereto, a stuffing box of corrosion resisting composition seated in said extension and provided with a flange resting upon the end thereof, a bonnet seated on said flange, drainage means between the flange and bonnet, means for securing the extension to the bonnet with said flange clamped therebetween including a split collar on the extension beneath said flange, a stem extending through said extension, stuffing box and bonnet provided with a valve at its lower end for engaging the valve seat and with screw means at its upper end, and screw means carried by the upper end of the bonnet in operative engagement with the screw means on the stem for moving the stem up and down, said flange on the stuffing box being of such diameter that the drip from its lower edge will be outward of said split collar.

2. In combination, a valve body of corrosion resisting composition having a passage therethrough in substantially a horizontal plane and provided with a valve seat lying at an acute angle to the horizontal, a tubular extension of the casing whose center line is axial with respect to the plane of the valve seat and at right angles thereto, a stuffing box of corrosion resisting composition seated in said extension and provided with a flange resting upon the end thereof, and having a drip lip at its lower edge extending out past the periphery of said extension, a bonnet seated on said flange, drainage means between the lower end of the bonnet and said flange, means including a collar on the extension for securing the extension to the bonnet with said flange clamped therebetween and with the periphery of the collar beneath the drip lip and lying inward of such lip, a stem extending through said extension, stuffing box and bonnet provided with a valve at its lower end for engaging the valve seat and with screw means at its upper end, and screw means carried by the upper end of the bonnet in operative engagement with the screw means on the stem for moving the stem up and down.

3. In combination, a valve body having a passage therethrough in substantially a horizontal plane and provided with a valve seat lying at an acute angle to the horizontal, a tubular extension of the casing whose center line is axial with respect to the plane of the valve seat and at right angles thereto, a stuffing box seated in said extension and provided with a flange resting upon the end thereof, a bonnet seated on said flange, means for securing the extension to the bonnet with said flange clamped therebetween, a stem extending slidably through said extension, stuffing box and bonnet provided with a valve at its lower end for engaging the valve seat and with screw means at its upper end, interengaging means between the stem and bonnet preventing the rotation of the stem, and means for reciprocating the stem comprising a bushing swivelled on the upper end of the bonnet and having threaded engagement at its upper portion with said screw means on the stem, said bushing having a snug fit with the stem below the screw means on the stem in order to shield the screw means from corrosive fluid which may escape past the stuffing box into the bonnet.

4. In combination, a valve body having a passage therethrough in substantially a horizontal plane and provided with a valve seat lying at an acute angle to the horizontal, a tubular extension of the casing whose center line is axial with respect to the plane of the valve seat and at right angles thereto, a stuffing box seated in said extension and provided with a flange resting upon the end thereof, a bonnet seated on said flange, means for securing the extension to the bonnet with said flange clamped therebetween, a stem extending slidably through said extension, stuffing box and bonnet provided with a valve at its lower end for engaging the valve seat and with screw means at its upper end, interengaging means between the stem and bonnet preventing the rotation of the stem, drainage means at the lower end of the bonnet, and means for reciprocating the stem comprising a bushing swivelled on the upper end of the bonnet and having threaded engagement at its upper portion with said screw means on the stem, said bushing having a snug fit with the stem below the screw means on the stem in order to shield the screw means from corrosive fluid which may escape past the stuffing box into the bonnet.

5. In combination, a valve body having a passage therethrough provided with a valve seat, a tubular extension on the body whose center line is axial with respect to the valve seat, a stuffing box seated in the extension and provided with a flange resting upon the end thereof, a bonnet seated on said flange, means for securing the bonnet to the extension with said flange clamped therebetween, a stem extending through said extension, stuffing box and bonnet and comprising a tubular sleeve of corrosion resisting composition closed at one end and constituting a valve for engaging said seat and carrying in its interior a rod of tough machinable metal extending to a point outside the sleeve and provided with screw threads, means for preventing the rotation of the sleeve in the bonnet, and means for reciprocating the sleeve comprising an internally threaded bushing through which the threaded portion of said rod extends swivelled on the bonnet and provided with a tubular portion which encloses the portion of the rod lying outside the sleeve and fits snugly around the upper portion of the sleeve.

O. JACOBSEN.